US011118052B2

(12) United States Patent
Silvi et al.

(10) Patent No.: US 11,118,052 B2
(45) Date of Patent: Sep. 14, 2021

(54) ELECTRICALLY CONDUCTIVE POLYCARBONATE-SILOXANE COMPOSITIONS

(71) Applicant: SHPP GLOBAL TECHNOLOGIES B.V., Bergen op Zoom (NL)

(72) Inventors: Norberto Silvi, Selkirk, NY (US); Edward Kung, Exton, PA (US); Peter Vollenberg, Mt. Vernon, IN (US); Christopher Ziegler, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/128,435

(22) Filed: Dec. 21, 2020

(65) Prior Publication Data
US 2021/0198483 A1    Jul. 1, 2021

(30) Foreign Application Priority Data

Dec. 31, 2019 (EP) .................................... 19220268

(51) Int. Cl.
*C08L 69/00* (2006.01)
*C08K 3/04* (2006.01)
*C08L 83/04* (2006.01)

(52) U.S. Cl.
CPC ................ *C08L 69/00* (2013.01); *C08K 3/04* (2013.01); *C08L 83/04* (2013.01); *C08K 2201/006* (2013.01)

(58) Field of Classification Search
CPC . C08G 77/448; C08L 69/00; C08K 2201/001; C08K 3/04
See application file for complete search history.

(56) References Cited

U.S. PATENT DOCUMENTS

| 4,508,640 A * | 4/1985 | Kanda ................. H05K 9/0083 252/503 |
| 4,791,016 A * | 12/1988 | Schulte ...................... C08J 3/21 252/511 |
| 2006/0148986 A1* | 7/2006 | Glasgow ................ C08L 83/10 525/100 |
| 2008/0132617 A1* | 6/2008 | Eckel ...................... C08L 69/00 524/127 |
| 2014/0197367 A1 | 7/2014 | Kumanan et al. |

FOREIGN PATENT DOCUMENTS

EP    3275936 A1    1/2018

* cited by examiner

*Primary Examiner* — Kuo Liang Peng
(74) *Attorney, Agent, or Firm* — Quicker Law, LLC

(57) ABSTRACT

Thermoplastic compositions include: (a) a thermoplastic polymer including a polycarbonate component; (b) a poly(carbonate-siloxane) copolymer; and (c) from 4 wt % to 25 wt % carbon black. The composition has a total siloxane content of from 2 wt % to 14 wt %. The thermoplastic compositions exhibit improved physical properties as compared to compositions that do not include the poly(carbonate-siloxane) copolymer, including volume resistivity, melt viscosity, impact strength, puncture impact energy and surface resistivity.

14 Claims, 12 Drawing Sheets

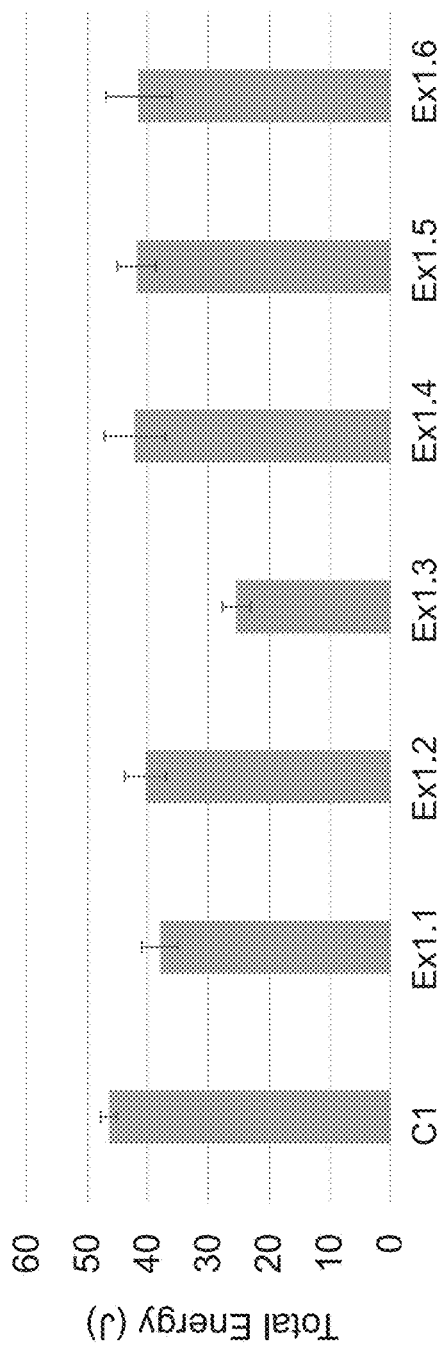
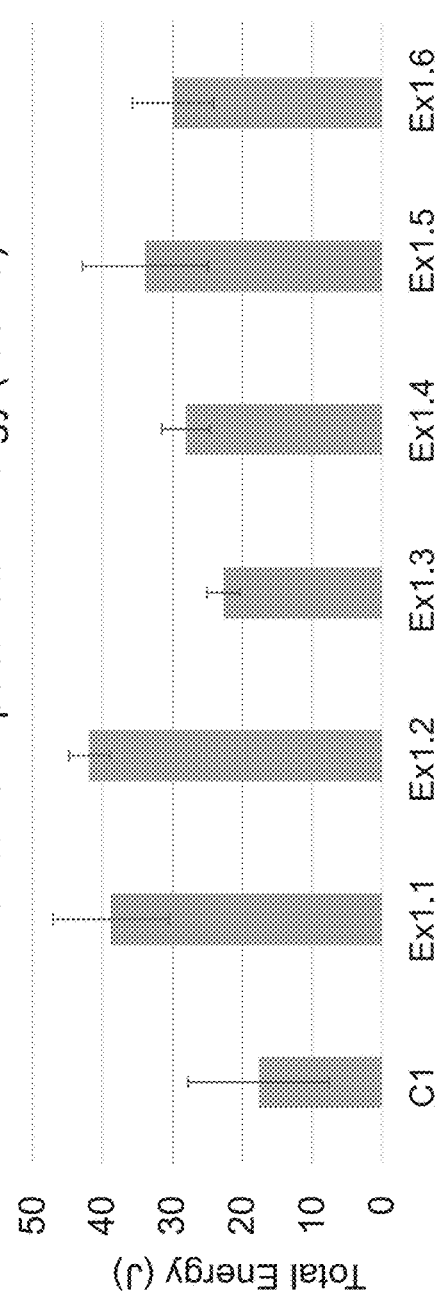
FIG. 4A
FIG. 4B

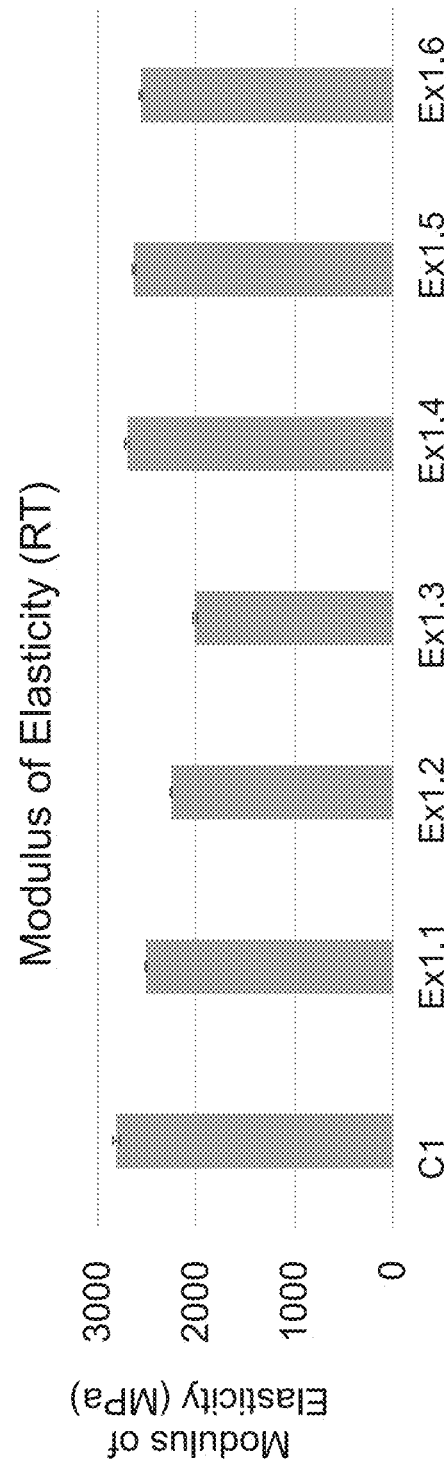
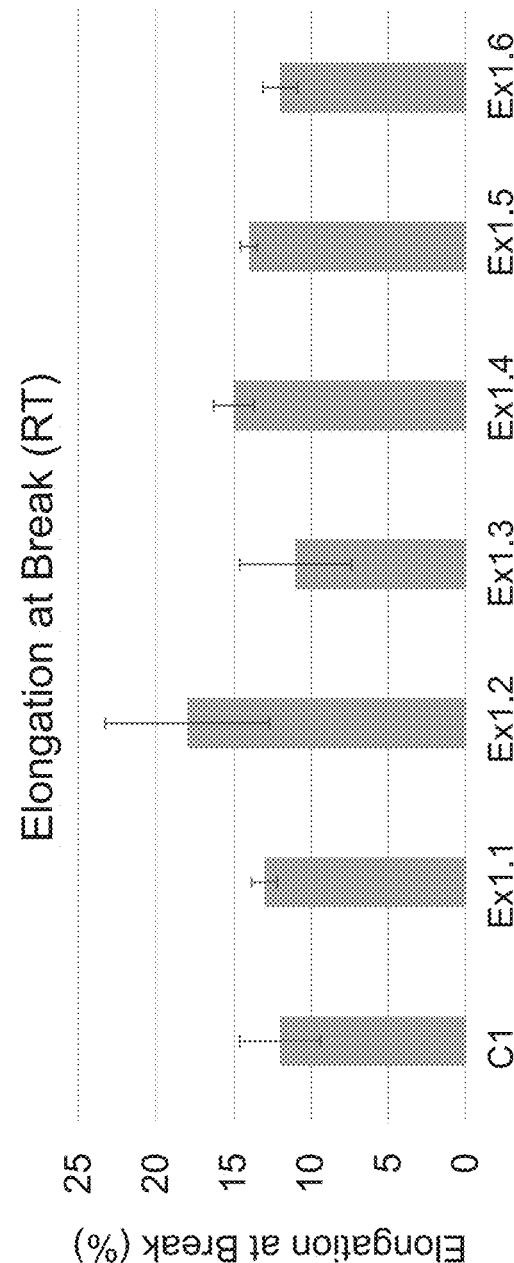
FIG. 5A
FIG. 5B

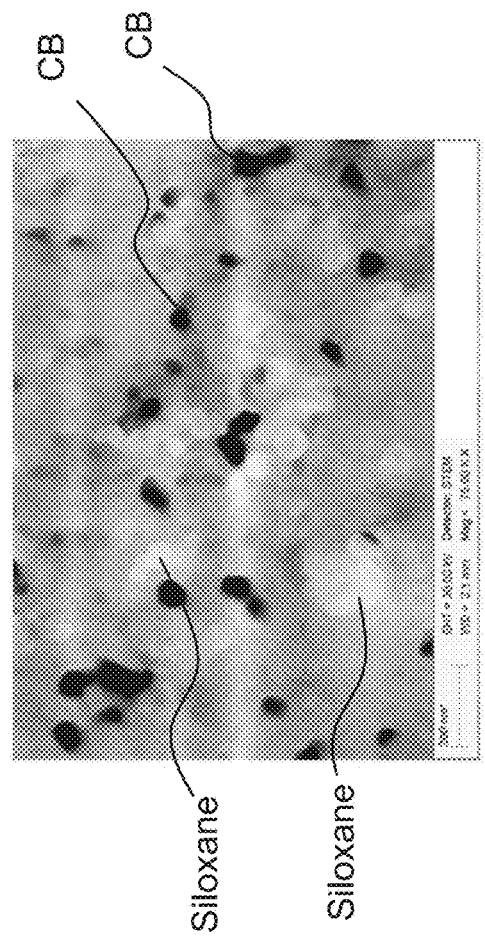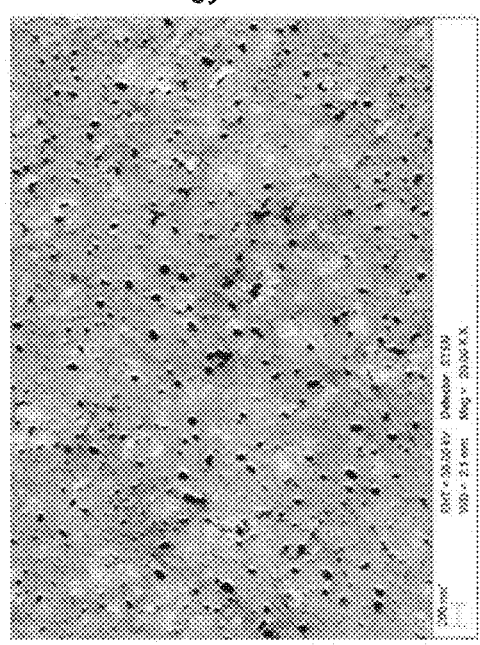
FIG. 7A (Ex1.3, 15% siloxane, 20kx)
FIG. 7B (Ex1.3, 15% siloxane, 75kx)
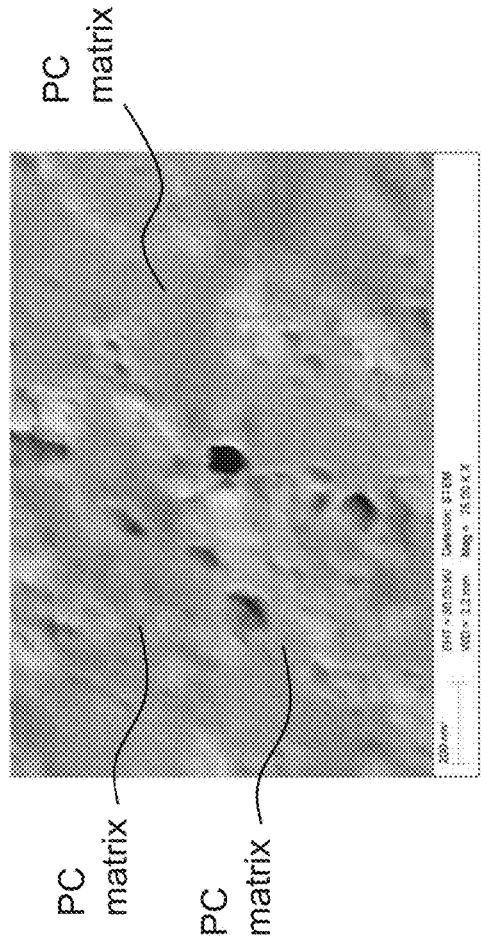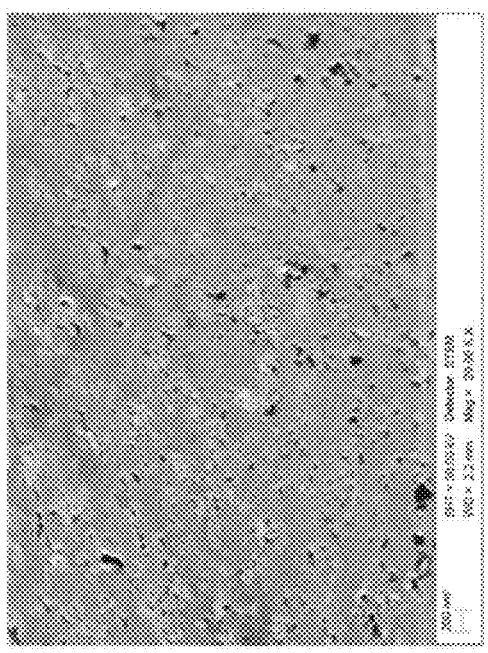
FIG. 7C (Ex1.3, 4.5% siloxane, 20kx)
FIG. 7D (Ex1.3, 4.5% siloxane, 75kx)

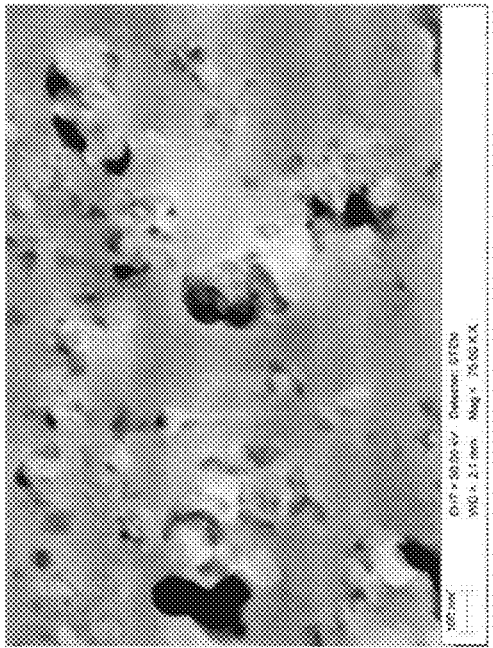
FIG. 7F (Ex1.3, 3% siloxane, 75kx)
FIG. 7H (Ex1.4, 1.5% siloxane, 75kx)
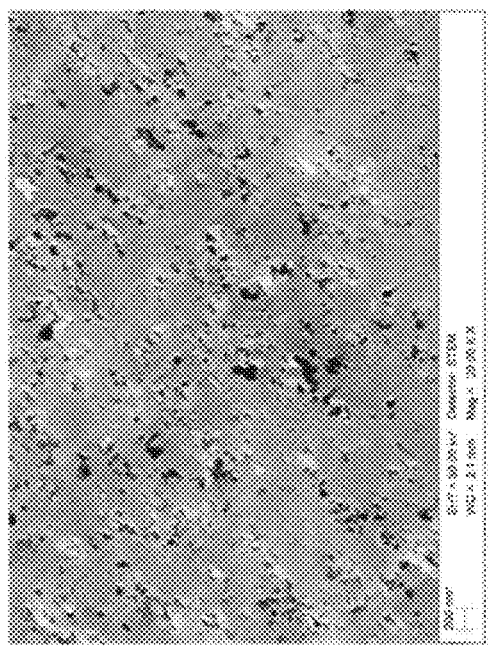
FIG. 7E (Ex1.3, 3% siloxane, 20kx)
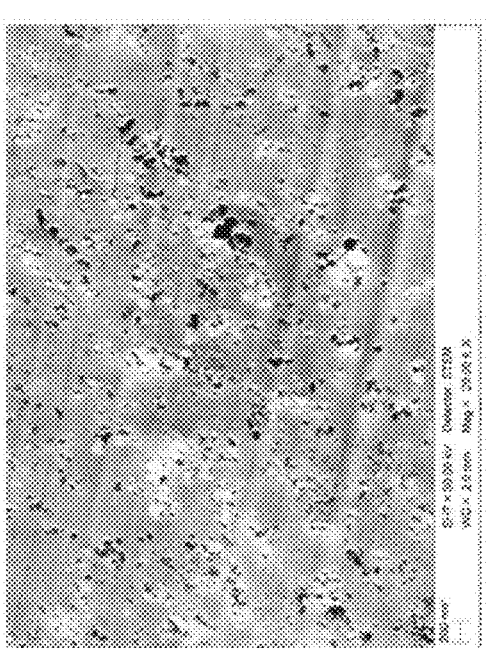
FIG. 7G (Ex1.4, 1.5% siloxane, 20kx)

ELECTRICALLY CONDUCTIVE POLYCARBONATE-SILOXANE COMPOSITIONS

FIELD OF THE DISCLOSURE

The present disclosure relates to electrically conductive thermoplastic compositions, and in particular to compositions including carbon black and a poly(carbonate-siloxane) copolymer.

BACKGROUND OF THE DISCLOSURE

Electrically conductive compositions including carbon powder and a polycarbonate or a mixture of polycarbonates as the matrix usually require high loadings of carbon conductive filler to achieve desired conductivity levels. Large carbon black loadings typically result in high viscosity (lower flow) under injection molding conditions, and low impact strength and ductility, especially when these materials are used at temperatures below room temperature (23° C.).

These and other shortcomings are addressed by aspects of the present disclosure.

SUMMARY

Aspects of the disclosure relate to thermoplastic compositions including: (a) a thermoplastic polymer including a polycarbonate component; (b) a poly(carbonate-siloxane) copolymer; and (c) from 4 wt % to 25 wt % carbon black. The composition has a total siloxane content of from 2 wt % to 14 wt %. The thermoplastic compositions exhibit improved physical properties as compared to compositions that do not include the poly(carbonate-siloxane) copolymer, including volume resistivity, melt viscosity, impact strength, puncture impact energy and surface resistivity.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIGS. 4A and 4B are graphs showing puncture impact energy at RT and −30° C. for comparative and example compositions formed according to the present disclosure.

FIGS. 5A and 5B are graphs showing modulus of elasticity and elongation at break at RT for comparative and example compositions formed according to the present disclosure.

FIGS. 7A-7H are scanning transmission electron microscope (STEM) images for comparative and example compositions formed according to the present disclosure.

DETAILED DESCRIPTION

Figure 1:
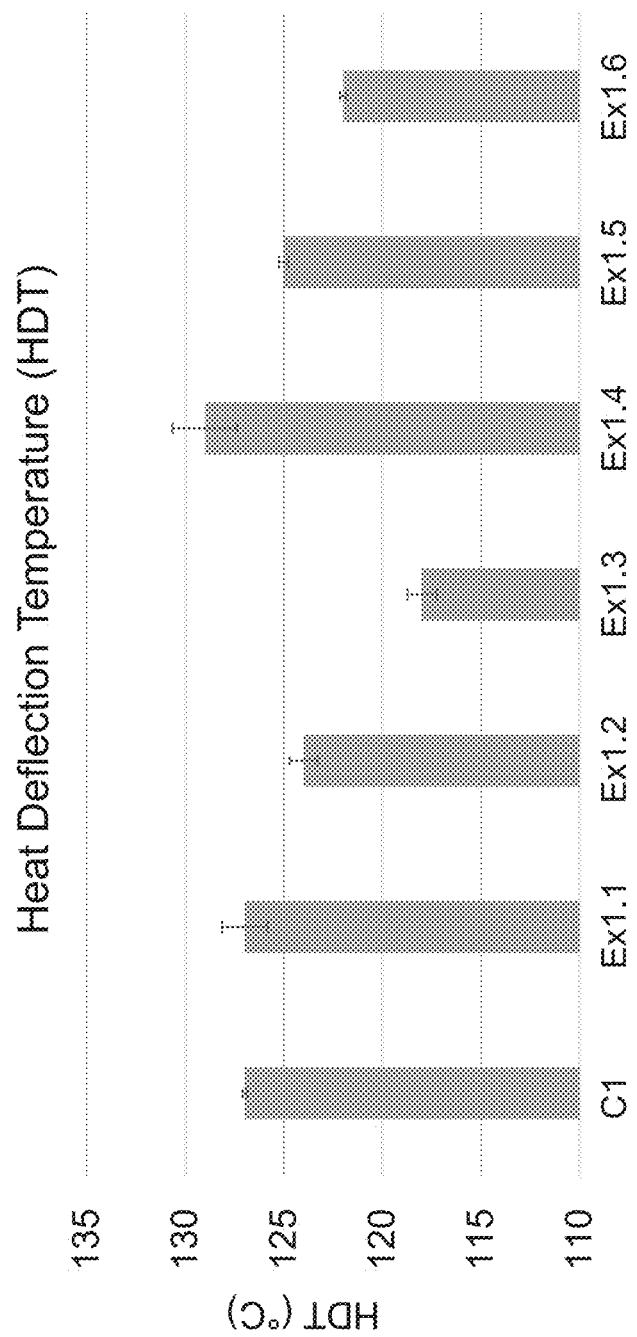
FIG. 1 is graph showing heat deflection temperature (HDT) for comparative and example compositions formed according to the present disclosure.

The present disclosure can be understood more readily by reference to the following detailed description of the disclosure and the Examples included therein. In various aspects, the present disclosure pertains to thermoplastic compositions including: (a) a thermoplastic polymer including a polycarbonate component; (b) a poly(carbonate-siloxane) copolymer; and (c) from 4 wt % to 25 wt % carbon black. The composition has a total siloxane content of from 2 wt % to 14 wt %. The thermoplastic compositions according to aspects described herein exhibit improved physical properties as compared to compositions that do not include the poly(carbonate-siloxane) copolymer, including volume resistivity, melt viscosity, impact strength, puncture impact energy and surface resistivity.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "Mn" can be used interchangeably, and refer to the statistical average molecular weight of all the polymer chains in the sample and is defined by the formula:

$$M_n = \frac{\Sigma N_i M_i}{\Sigma N_i},$$

where Mi is the molecular weight of a chain and Ni is the number of chains of that molecular weight. Mn can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\Sigma N_i M_i^2}{\Sigma N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. Mw can be determined for polymers, e.g., polycarbonate polymers, by methods well known to a person having ordinary skill in the art using molecular weight standards, e.g., polycarbonate standards or polystyrene standards, preferably certified or traceable molecular weight standards.

The terms "BisA," "BPA," or "bisphenol A," which can be used interchangeably, as used herein refers to a compound having a structure represented by the formula:

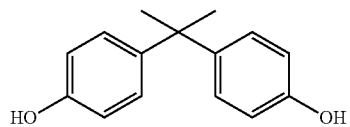 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to thermoplastic compositions including: (a) a thermoplastic polymer including a polycarbonate component; (b) a poly(carbonate-siloxane) copolymer; and (c) from 4 wt % to 25 wt % carbon black. The composition has a total siloxane content of from 2 wt % to 14 wt %.

The incorporation of different levels of dimethylsiloxane in the form of poly(carbonate-siloxane) copolymers to the compositions results in them having higher electrical conductivity, lower steady-state viscosity (higher flow) at high shear rates, higher impact strength and more ductile performance at lower temperatures. These unexpected findings may allow the level of carbon black in the siloxane-containing compositions to be reduced to match the electrical conductivity of substantially identical comparative compositions that do not include the poly(carbonate-siloxane) copolymer. Lower loadings of carbon in these formulations results in even further improvements to the ductility, impact strength and viscosity thus improving flow under high shear rate conditions. Additionally, coarse control of poly(carbonate-siloxane) copolymer loading relative to carbon black loading can allow for easily controlled surface conductivities in the electrostatic discharge (ESD) range (E6-E9). This range is typically difficult to achieve as small changes (fractions of a percent) in carbon black loading can cause a polymer matrix to switch from insulative (surface resistivity (SR) >E12) to conductive (SR<E3), completely missing the important ESD range of electrical surface resistivities.

The elastomeric siloxane block of the poly(carbonate-siloxane) copolymer contributes to the low temperature impact, weatherability and release properties, while the thermoplastic polycarbonate block contributes to heat resistance and modulus properties. Compared to a control containing no siloxane, compositions according to aspects of the disclosure exhibit the following properties:

Greater low-temperature (LT, −30° C.) UNII and NII impact strength;

One to four orders of magnitude higher electrical conductivity (for the same carbon black loading); and Improved flow (lower steady-state viscosity) under injection molding conditions.

In some aspects the thermoplastic composition includes from about 2 wt % to about 14 wt % total siloxane content. Formulations including less than 2 wt % siloxane may not exhibit one or more of the above improvements, and compositions including greater than 14 wt % siloxane may exhibit molding issues such as phase segregation and delamination. These unexpected findings may the level of carbon black in the siloxane-containing compositions to be reduced to match the surface and volume resistivities of substantially identical reference compositions that do not include the poly(carbonate-siloxane) copolymer. Lower loadings of carbon may be advantageous since it may lead, for example, to better ductility and impact strength and also to lower viscosity thus improving flow under injection molding conditions even further. Additionally, through coarse control of siloxane loading via poly(carbonate-siloxane copolymer loading, surface resistivities within the E6-E9 range (ESD) can be achieved. This is unexpected and advantageous as even small increases in carbon black loading in conventional polycarbonate compositions is generally known to cause exponential increases in conductivity. Such behavior makes it difficult to achieve conductivities between E6-E9 without having to utilize specially formulated and highly expensive types of carbon black. This middle range (E6-E9) is generally missed as a material goes from insulating to conductive over the course of a few fractions of a percent of carbon black, whereas thermoplastic compositions according to aspects of the disclosure could allow for the step-wise increase of conductivity through the ESD. Accordingly, thermoplastic compositions according to aspects of the disclosure can enable reproducible and repeatable ESD performance in a polycarbonate-siloxane matrix using standard carbon black or carbon fiber.

The poly(carbonate-siloxane) copolymer includes carbonate units and siloxane units. Suitable carbonate units are shown in formula (1)

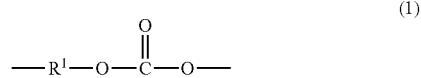

(1)

wherein at least 60 percent of the total number of $R^1$ groups is aromatic, or each $R^1$ contains at least one $C_{6-30}$ aromatic group. A combination of different $R^1$ groups can be present. The carbonate units can be derived from a dihydroxy compound such as an aromatic dihydroxy compound of formula (2) or a bisphenol of formula (3)

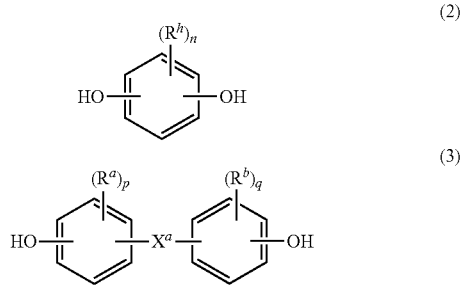

wherein in formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other aspects in formula (2), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)—wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination including different diphenol compounds can be used.

Examples of bisphenols (3) include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. A combination including different bisphenol compounds can be used.

Specific dihydroxy compounds include resorcinol, 2,2-bis (4-hydroxyphenyl) propane (bisphenol A or BPA), 3,3-bis (4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In an aspect of formula (2), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In more preferred aspect, the bisphenol polycarbonate is a bisphenol A polycarbonate homopolymer, also referred to as bisphenol A homopolycarbonate, which has repeating structural carbonate units of formula (1a).

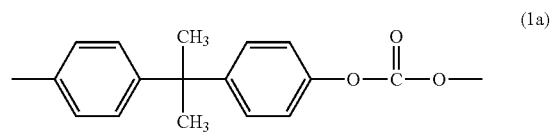

Such linear homopolymers containing bisphenol A carbonate units (BPA-PC) include those commercially available under the trade name LEXAN™ from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN™ CFR from SABIC.

The siloxane units (also referred to as polysiloxane blocks) are optionally of formula (4)

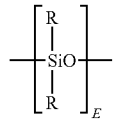

wherein each R is independently a $C_{1-13}$ monovalent organic group. For example, R can be a $C_{1-13}$ alkyl, $C$-$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) is desired, R is unsubstituted by halogen. A combination of the foregoing R groups can be used in the same poly(carbonate-siloxane).

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, each R is independently methyl, trifluoromethyl, or phenyl.

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (5)

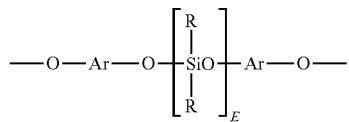

wherein E is as defined for formula (4); each R can be the same or different, and is as defined for formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (6a) and (6b)

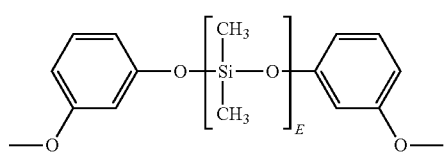

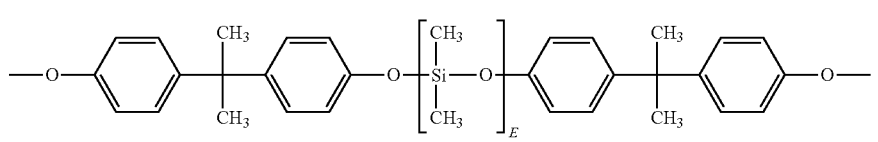

wherein E is as described in Formula (4). In an aspect, E has an average value of 10 to 80 or 10 to 40, and in still another aspect, E has an average value of 40 to 80, or 40 to 70.

In another aspect, the siloxane units are of formula (7)

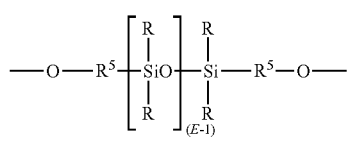

wherein R and E are as described for formula (4), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (8):

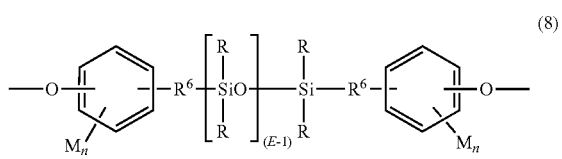

(8)

wherein R and E are as defined for formula (5). $R^6$ in formula (8) is a divalent $C_{2-8}$ aliphatic group. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an aspect in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (8), R is methyl, or a combination of methyl and trifluoropropyl, or a combination of methyl and phenyl. In still another aspect in formula (8), R is methyl, M is methoxy, n is one, and $R^6$ is a divalent $C_{1-3}$ aliphatic group. Preferred polydiorganosiloxane blocks are of the formulas

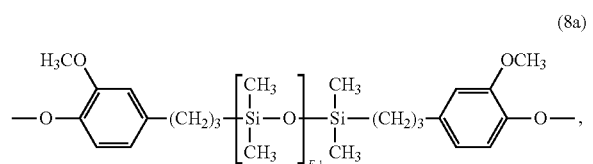

(8a)

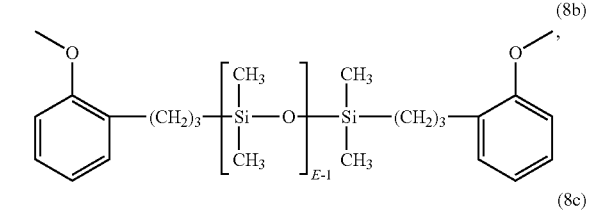

(8b)

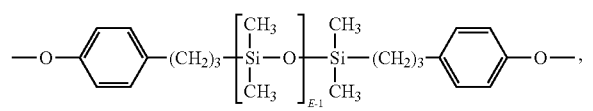

(8c)

or a combination thereof, wherein E has an average value of 10 to 100, preferably 20 to 60, more preferably 30 to 50, or 40 to 50.

In an aspect, the poly(carbonate-siloxane) includes carbonate units derived from bisphenol A, and repeating siloxane units (8a), (8b), (8c), or a combination thereof (preferably of formula 8a), wherein E has an average value of 10 to 100, or 20 to 60, or 30 to 60, or 40 to 60. In an aspect, the poly(carbonate-siloxane)s include carbonate units derived from bisphenol A and repeating siloxane units of formula (8a) (8b), or (8c), wherein E has an average value of 10 to 100, or 20 to 60, or 30 to 50, or 40 to 50.

The poly(carbonate-siloxane) can have a siloxane content of from about 5 wt % to about 25 wt %, or in particular aspects from about 18 wt % to about 22 wt %, based on the total weight of the poly(carbonate-siloxane). As used herein, "siloxane content" of the poly(carbonate-siloxane) means the content of siloxane units based on the total weight of the poly(silozane-carbonate). The poly(carbonate-siloxane) can have a weight average molecular weight of 26,000 to 45,000 Da, or 30,000 to 43,000 Da, or 35,000 to 40,000 Da as measured by gel permeation chromatography using a crosslinked styrene-divinyl benzene column, at a sample concentration of 1 milligram per milliliter, and as calibrated with bisphenol A polycarbonate standards. In other aspects, the poly(carbonate-siloxane) can have a weight average molecular weight of 10,000 to 100,000 Da, or 50,000 to 100,000 Da.

In some aspects the polycarbonate component includes a polycarbonate homopolymer, a polycarbonate copolymer that is different from the poly(carbonate-siloxane) copolymer described above, or a combination thereof. Suitable polycarbonate homopolymers include, but are not limited to, LEXAN™ 105 and high flow (HF) polycarbonate, available from SABIC.

The thermoplastic composition according to aspects of the disclosure includes from 4 wt % to 25 wt % carbon black. In particular aspects the composition includes from 8 wt % to 22 wt % carbon black. The carbon black may be a structured carbon black in some aspects, defined by having a Brunauer-Emmett-Teller (BET) nitrogen surface area (SA) of from about 65 square meters per gram (m²/g) to about 1500 m²/g as determined in accordance with ASTM D3037. Exemplary carbon black suitable for use in aspects of the disclosure include, but are not limited to, Ensaco® 250G (BET 65 m²/g), Ensaco® 260G (BET 70 m²/g), and Ensaco® 350G (BET 770 m²/g), all available from Imerys, and Ketjenblack® EC-600JD (BET 1300 m²/g), available from Lion Specialty Chemicals.

In a particular aspect the thermoplastic composition includes from 13 wt % to 21 wt % carbon black, a total siloxane content of from 5 wt % to 12 wt %, and the poly(carbonate-siloxane) copolymer has a siloxane content of from 15 wt % to 25 wt %.

Properties of Thermoplastic Compositions

In some aspects the composition has a volume resistivity of from $10^3$ to $10^9$ Ohm-centimeters (Ohm-cm) as determined in accordance with ASTM D257. In particular aspects the composition has a volume resistivity of from $10^6$ to $10^9$ Ohm-cm as determined in accordance with ASTM D257.

The thermoplastic compositions have improved properties as compared to substantially identical reference (comparative) compositions that do not include the poly(carbonate-siloxane) copolymer. As used herein a "substantially identical" reference composition is a composition that has the same components, and in the same amounts, as the example composition, but the reference composition does not include the recited component (e.g., the poly(carbonate-siloxane copolymer). The component removed from the reference composition is replaced by the same amount of a conventional thermoplastic polymer comprising a polycarbonate component (e.g., a polycarbonate homopolymer or a combination thereof).

Accordingly, in some aspects the thermoplastic composition has a melt viscosity at a shear rate of from 500 to 3000 l/second as determined in accordance with ASTM D3835 that is at least about 5% lower than that of a substantially identical reference thermoplastic composition that does not include a poly(carbonate-siloxane) copolymer. In further aspects the thermoplastic composition has a melt viscosity at a shear rate of from 500 to 3000 l/second as determined in accordance with ASTM D3835 that is at least about 10% lower, or at least about 15% lower, or at least about 20% lower, or at least about 25% lower, or at least about 30% lower, or at least about 35% lower, or at least about 40% lower, or at least about 45% lower, or at least about 50% lower, or at least about 55% lower, or at least about 60% lower, than that of a substantially identical reference thermoplastic composition that does not include a poly(carbonate-siloxane) copolymer.

In certain aspects the thermoplastic composition has a notched Izod impact strength at room temperature (RT, 23° C.) as determined in accordance with ASTM D256 that is at least about 100% higher than that of a substantially identical reference thermoplastic composition that does not include a poly(carbonate-siloxane) copolymer. In specific aspects the thermoplastic composition has a notched Izod impact strength at RT as determined in accordance with ASTM D256 that is at least about 200% higher, or at least about 300% higher, or at least about 400% higher, or at least about 500% higher, or at least about 600% higher, or at least about 700% higher, than that of a substantially identical reference thermoplastic composition that does not include a poly(carbonate-siloxane) copolymer.

In some aspects the thermoplastic composition has a notched Izod impact strength at −30° C. as determined in accordance with ASTM D256 that is at least about 40% higher than that of a substantially identical thermoplastic composition that does not include a poly(carbonate-siloxane) copolymer. In further aspects the thermoplastic composition has a notched Izod impact strength at −30° C. as determined in accordance with ASTM D256 that is at least about 50% higher, or at least about 75% higher, or at least about 100% higher, or at least about 200% higher, or at least about 300% higher, or at least about 400% higher, or at least about 500% higher, than that of a substantially identical thermoplastic composition that does not include a poly(carbonate-siloxane) copolymer.

In certain aspects the thermoplastic composition has a puncture impact total energy at −30° C. as determined in accordance with ASTM D3763 that is at least about 50% higher than that of a substantially identical thermoplastic composition that does not include a poly(carbonate-siloxane) copolymer. In specific aspects the thermoplastic composition has a puncture impact total energy at −30° C. as determined in accordance with ASTM D3763 that is at least about 60% higher, or at least about 70% higher, or at least about 80% higher, or at least about 90% higher, or at least about 100% higher, or at least about 110% higher, or at least about 120% higher, or at least about 130% higher, than that of a substantially identical thermoplastic composition that does not include a poly(carbonate-siloxane) copolymer.

In some aspects the thermoplastic composition has a surface resistivity as determined in accordance with ASTM D257 that is at least about 90% lower than that of a substantially identical thermoplastic composition that does not include a poly(carbonate-siloxane) copolymer. In further aspects the thermoplastic composition has a surface resistivity as determined in accordance with ASTM D257 that is at least about 100% lower, or at least about 200% lower, or at least about 300% lower, or at least about 400% lower, or at least about 500% lower, or at least about 600% lower, or at least about 700% lower, or at least about 800% lower, or at least about 900% lower, or at least about 1000% lower, than that of a substantially identical thermoplastic composition that does not include a poly(carbonate-siloxane) copolymer.

Methods of Manufacture

The one or any foregoing components described herein may be first dry blended with each other, or dry blended with any combination of foregoing components, then fed into an extruder from one or multi-feeders, or separately fed into an extruder from one or multi-feeders. Additional components such as additives or fillers may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In some aspects the melt processed composition exits processing equipment such as an extruder through small exit holes in a die. The resulting strands of molten resin may be cooled by passing the strands through a water bath. The cooled strands can be chopped into pellets for packaging and further handling. Exemplary conditions for making thermoplastic compositions according to aspects of the disclosure are set forth in the examples below.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

In particular aspects the thermoplastic compositions can be used in applications requiring low-temperature impact/ductility, high flow under injection molding conditions and high electrical conductivity.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising:
(a) a thermoplastic polymer comprising a polycarbonate component;
(b) a poly(carbonate-siloxane) copolymer; and
(c) from 4 wt % to 25 wt % carbon black,
wherein the composition has a total siloxane content of from 2 wt % to 14 wt %.

Aspect 2. The thermoplastic composition according to Aspect 1, wherein the poly(carbonate-siloxane) copolymer has a siloxane content of from 5 wt % to 25 wt %.

Aspect 3. The thermoplastic composition according Aspect 1 or 2, wherein the polycarbonate component comprises a polycarbonate homopolymer, a polycarbonate copolymer that is different from the poly(carbonate-siloxane) copolymer in (b), or a combination thereof.

Aspect 4. The thermoplastic composition according to any of Aspects 1 to 3, wherein the composition comprises from 8 wt % to 22 wt % carbon black.

Aspect 5. The thermoplastic composition according to any of Aspects 1 to 4, wherein the carbon black is a structured carbon black having a BET nitrogen surface area of from about 65 square meters per gram ($m^2/g$) to about 1500 $m^2/g$ as determined in accordance with ASTM D3037.

Aspect 6. The thermoplastic composition according to any of Aspects 1 to 5, wherein the composition has a volume resistivity of from $10^3$ to $10^9$ Ohm-centimeters (Ohm-cm) as determined in accordance with ASTM D257.

Aspect 7. The thermoplastic composition according to any of Aspects 1 to 6, wherein the composition has a melt viscosity at a shear rate of from 500 to 3000 1/second as determined in accordance with ASTM D3835 that is at least about 5% lower than that of a substantially identical reference thermoplastic composition that does not include a poly(carbonate-siloxane) copolymer.

Aspect 8. The thermoplastic composition according to any of Aspects 1 to 7, wherein the composition has a notched Izod impact strength at room temperature as determined in accordance with ASTM D256 that is at least about 100% higher than that of a substantially identical reference thermoplastic composition that does not include a poly(carbonate-siloxane) copolymer.

Aspect 9. The thermoplastic composition according to any of Aspects 1 to 8, wherein the composition has a notched Izod impact strength at −30 degrees Celsius (° C.) as determined in accordance with ASTM D256 that is at least about 40% higher than that of a substantially identical thermoplastic composition that does not include a poly(carbonate-siloxane) copolymer.

Aspect 10. The thermoplastic composition according to any of Aspects 1 to 9, wherein the composition has a puncture impact total energy at −30 degrees Celsius (° C.) as determined in accordance with ASTM D3763 that is at least about 50% higher than that of a substantially identical thermoplastic composition that does not include a poly(carbonate-siloxane) copolymer.

Aspect 11. The thermoplastic composition according to any of Aspects 1 to 10, wherein the composition has a surface resistivity as determined in accordance with ASTM D257 that is at least about 90% lower than that of a substantially identical thermoplastic composition that does not include a poly(carbonate-siloxane) copolymer.

Aspect 12. The thermoplastic composition according to any of Aspects 1 to 11, wherein the composition comprises from 10 wt % to 21 wt % carbon black and a total siloxane content of from 5 wt % to 12 wt %, and wherein the poly(carbonate-siloxane) copolymer has a siloxane content of from 5 wt % to 25 wt %.

Aspect 13. The thermoplastic composition according to any of Aspects 1 to 11, wherein the composition comprises from 13 wt % to 21 wt % carbon black and a total siloxane content of from 5 wt % to 12 wt %, and wherein the poly(carbonate-siloxane) copolymer has a siloxane content of from 5 wt % to 25 wt %.

Aspect 14. An article comprising the thermoplastic composition according to any of Aspects 1 to 13.

Aspect 15. The article according to Aspect 14, wherein the article is an electronic component.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

A 40 millimeter (mm), co-rotating intermeshing twin-screw extruder was used to compound compositions containing a mixture of two polycarbonate homopolymers, carbon black, and different loadings of two polycarbonate-siloxane copolymers. The two polycarbonates used in these compositions were LEXAN™ 105, a 100-grade polycarbonate powder, and a linear, high flow polycarbonate homopolymer used in the injection molding of thin-wall applications. The carbon black used in the compositions was Ensaco® 250G, a conductive carbon black available from Imerys and having a BET nitrogen surface area of 65 $m^2/g$. The two poly(carbonate-siloxane) copolymers included an opaque EXL resin including 20 wt % siloxane and a transparent EXL resin containing 6 wt % siloxane. The EXL resins are available from SABIC. The 6 wt % PC-Si copolymer has a Mw of about 23,000; the 20 wt % PC-Si copolymer has a MW of about 30,000. The siloxane component of these copolymers was a D45 eugenol-capped siloxane soft block for elastomeric resins. Silicone block lengths longer than D45 can result in compositions that have haze and opacity, even when uniformly distributed in the polymer.

The materials in the thermoplastic compositions were added to the extruder, melted, mixed and pushed out of the extruder through a six-hole die plate. The extruder was generally operated at a screw speed of 325 revolutions per minute (rpm), at a rate on 45 pounds per hour (lb/hr) and at a torque of 50-60% of maximum. The extruder barrel temperature was maintained between about 180-195° C. (upstream, in the vicinity of the extruder's feed throat) and 285-305° C. (downstream, in the vicinity of the extruder's die plate). The die plate temperature was maintained at between 285-295° C., and the temperature of the melt exiting the extruder was measured at between 310-320° C.

The compositions were molded into ASTM plaques to test for the properties described below. Surface and volume electrical resistivities were tested on 4 inch (in)×5 in injection molded plaques. The compositions that were formed are shown in Table 1 below:

TABLE 1

| Item Description | Unit | C1 | Ex1.1 | Ex1.2 | Ex1.3 | Ex1.4 | Ex1.5 | Ex1.6 |
|---|---|---|---|---|---|---|---|---|
| PC/Additive: | | | | | | | | |
| PC Powder (100 grade) | % | 42.77 | 30.27 | 17.77 | 5.27 | 30.27 | 17.77 | 5.27 |
| High Flow PC | % | 42.77 | 30.27 | 17.77 | 5.27 | 30.27 | 17.77 | 5.27 |
| EXL resin, opaque, 20 wt % siloxane | % | | 25 | 50 | 75 | | | |
| EXL resin, transp., 6 wt % siloxane | % | | | | | 25 | 50 | 75 |
| Irganox 1076 | % | 0.2 | 0.2 | 0.2 | 0.2 | 0.2 | 0.2 | 0.2 |
| Irgafos 168 | % | 0.26 | 0.26 | 0.26 | 0.26 | 0.26 | 0.26 | 0.26 |
| Carbon Black | % | 14 | 14 | 14 | 14 | 14 | 14 | 14 |
| Formulation total: | % | 100 | 100 | 100 | 100 | 100 | 100 | 100 |
| PC/Additives: | % | 86 | 86 | 86 | 86 | 86 | 86 | 86 |
| Carbon black: | % | 14 | 14 | 14 | 14 | 14 | 14 | 14 |
| Total siloxane content: | % | — | 5 | 10 | 15 | 1.5 | 3.0 | 4.5 |

Example compositions Ex1.1-Ex1.3 included a poly(carbonate-siloxane) copolymer having 20 wt % siloxane content; example compositions Ex1.4-Ex1.6 included a poly(carbonate-siloxane) copolymer having 6 wt % siloxane content. Control composition C.1 did not include a poly(carbonate-siloxane) copolymer. All samples molded well, except for Ex1.3 (15 wt % overall siloxane content) which delaminated. The samples were tested for heat deflection temperature (HDT), notched Izod impact strength (NII) and unnotched Izod impact strength (UNII) at room temperature (RT, degrees Celsius ° C.) and at −30 degrees ° C., puncture impact energy at RT and −30° C., modulus of elasticity and elongation at break at RT, surface resistivity and volume resistivity, and steady state melt viscosity at shear rates of 100, 500, 1000, 1500 and 3000 inverse seconds (1/s). Graphs showing the results of this testing are presented in FIGS. 1-7.

The HDT results are shown in FIG. 1. HDT was tested in accordance with ASTM D648 at 1.82 megapascals (MPa) and a sample thickness of 3.2 millimeter. LEXAN™ 105 has an unannealed HDT of 132° C. under similar conditions. From the data it is observed that for the same copolymer, heat resistance decreased with increasing amounts of added copolymer (compare Ex1.1 to Ex1.2 and Ex1.3; compare Ex1.4 to Ex1.5 and Ex1.6). Further, for the same copolymer loading, a higher siloxane content in the copolymer led to a lower HDT—compare Ex1.1 to Ex1.4 (25% copolymer loading), Ex1.2 to Ex1.5 (50% copolymer loading), and Ex1.3 to Ex 1.6 (75% copolymer loading).

Figure 2A:
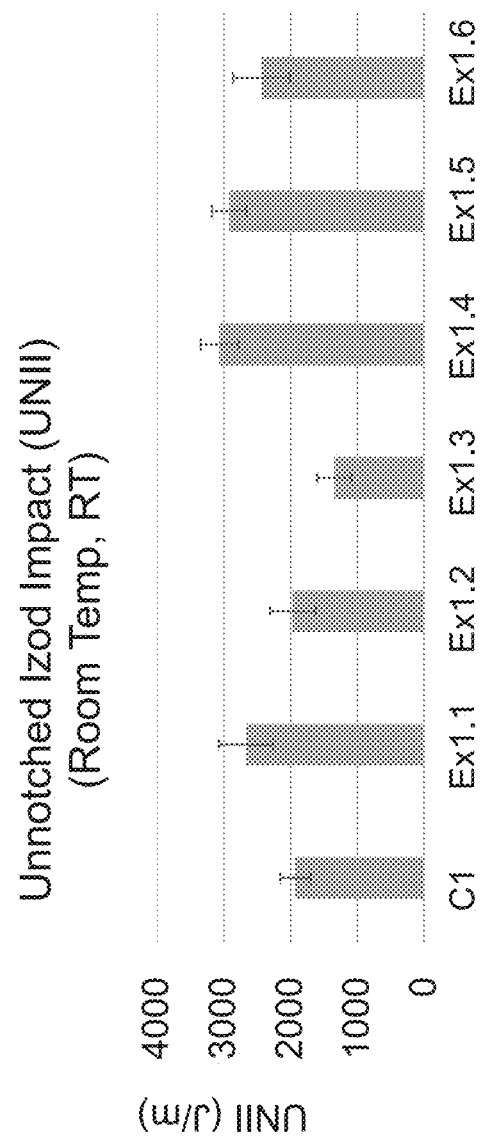
FIGS. 2A and 2B are graphs showing unnotched Izod impact strength (UNII) and notched Izod impact strength (NII) at room temperature (RT, degrees Celsius ° C.) for comparative and example compositions formed according to the present disclosure.

FIG. 2A shows the UNII property at RT. For the same copolymer, UNII decreased with increasing amounts of poly(carbonate-siloxane) copolymer (PC-Si copolymer). For the same copolymer loading, a higher siloxane content in the PC-Si copolymer led to a lower value of impact strength.

Figure 2B:
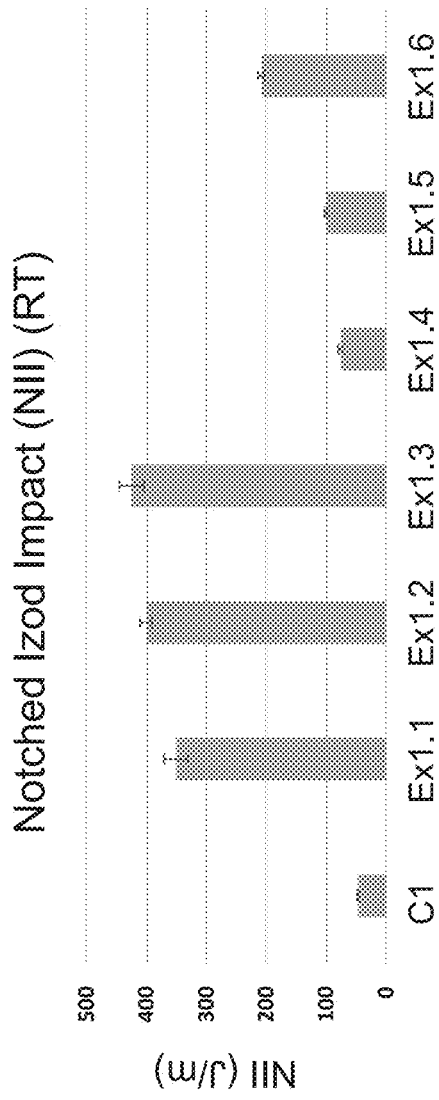

FIG. 2B shows the NII property at RT. For comparison, LEXAN™ 105 has a RT NII of 907 joules per meter (J/m). From the data, it is observed that replacing LEXAN™ with PC-Si copolymer produced blends of much improved NII at RT. The effect was more pronounced in the case of the PC-Si copolymer with the higher content of siloxane. For each PC-Si copolymer, NII increased with the amount of PC-Si copolymer in the formulation.

Figure 3A:
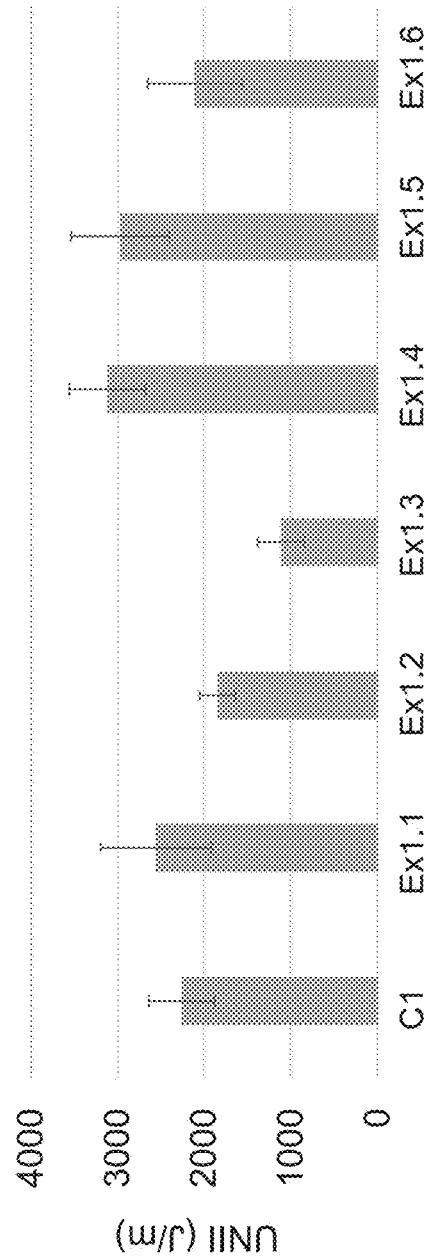
FIGS. 3A and 3B are graphs showing UNII and NII at −30° C. for comparative and example compositions formed according to the present disclosure.

FIG. 3A shows the UNII property at −30° C. For the same PC-Si copolymer, UNII decreased with increasing amounts of copolymer. Further, for the same PC-Si copolymer loading, a higher siloxane content in the copolymer led to a lower value of UNII.

Figure 3B:
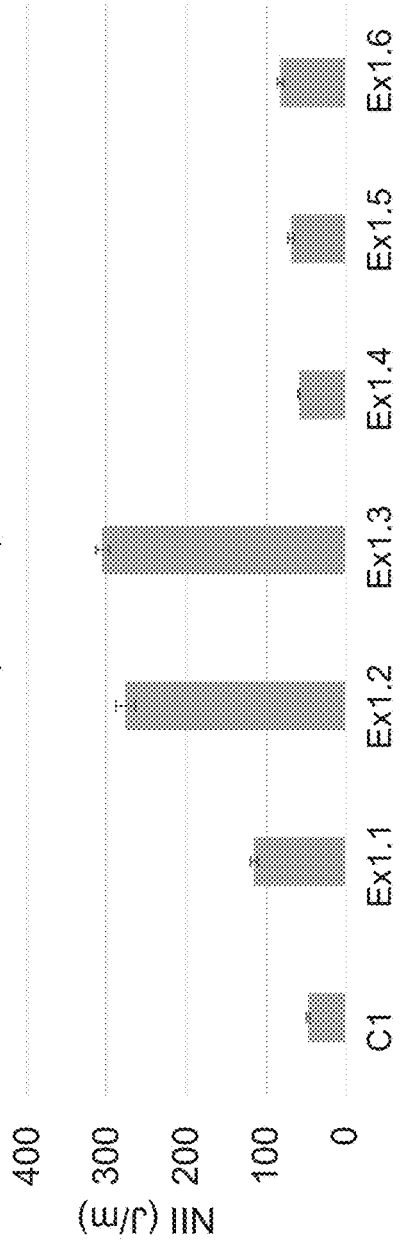

FIG. 3B shows the NII property at −30° C. Replacing LEXAN™ with PC-Si copolymer produced blends of much improved low temperature (LT) NII, especially for the PC-Si copolymer with the higher content of siloxane. In addition, for each PC-Si copolymer, LT NII increased with the amount of copolymer in the formulation, especially for the copolymer with the higher content of siloxane.

FIGS. 4A and 4B show the puncture impact energy (in joules, J) of the samples at RT and −30° C., respectively. Testing was performed in accordance with ASTM D3763. For comparison, LEXAN™ 105 has a peak puncture impact energy of 64 J at RT. From FIG. 4A, replacing LEXAN™ with PC-Si copolymer of different siloxane content did not appreciably change the RT puncture impact strength of the material, except for composition Ex1.3 which showed signs of delamination when molded. From FIG. 4B, replacing LEXAN™ with PC-Si copolymer appears to have produced blends of improved LT puncture impact strength, especially for the copolymer with the higher content of siloxane. Of note, test error was significantly higher for the samples tested at −30° C.

FIGS. 5A and 5B show the modulus of elasticity (MPa) and elongation at break (%) of the samples at RT. Testing was performed in accordance with ASTM D790. For comparison, LEXAN™ 105 has a flexural modulus of 2340 MPa at 1.3 millimeter per minute (mm/min) and a 50 mm span. From FIG. 5A it was observed that replacing LEXAN™ with PC-Si copolymer of different siloxane content did not appreciably change the modulus of elasticity of the material, especially for the blends with the copolymer containing the lower content of siloxane. From FIG. 5B, it was observed that RT elongation at break was not significantly affected by the addition of PC-Si copolymer to the formulation.

Figure 6A:
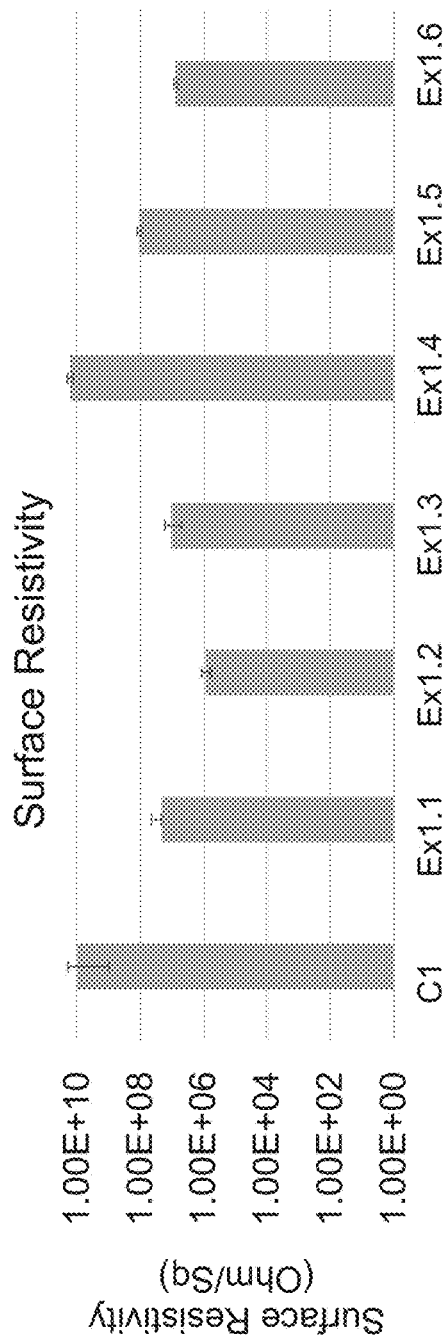
FIGS. 6A-6C are graphs showing surface resistivity and volume resistivity for comparative and example compositions formed according to the present disclosure.
Figure 6B:
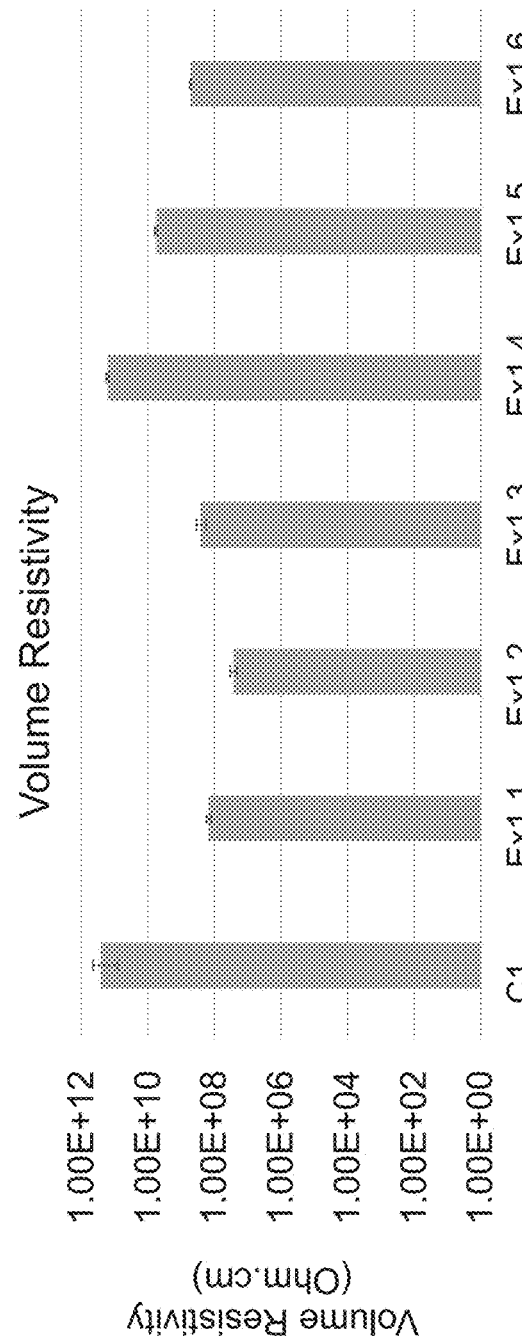

FIGS. 6A and 6B show the surface resistivity (in ohms per square, Ohm/sq) and volume resistivity (in Ohm-centimeters, Ohm-cm) for the samples. Testing was performed in accordance with ASTM D257. From the figures, it was observed that replacing LEXAN™ with PC-Si copolymer of different siloxane content appreciably increased the surface and volume conductivities of the compositions, especially in the case of the copolymer containing the higher content of siloxane, for which the electrical resistivity decreased by about 3 orders of magnitude compared to comparative composition C1. In addition, the surface and volume resistivities of the blends containing increasing levels of the low-siloxane copolymer (Ex. 1.4-Ex1.6) showed a clearly defined decreasing trend. Without being bound by theory, it is speculated that carbon black has more affinity for the polymer (polycarbonate here) than the siloxane, and adding increasing levels of siloxane to the composition "forces" the carbon black to be confined to smaller and smaller polymer domains, therefore increasing the concentration of carbon black in the polymer phase (amount of carbon black per unit volume of polymer) thus reducing the electrical resistivity of the composite material.

Figure 6C:
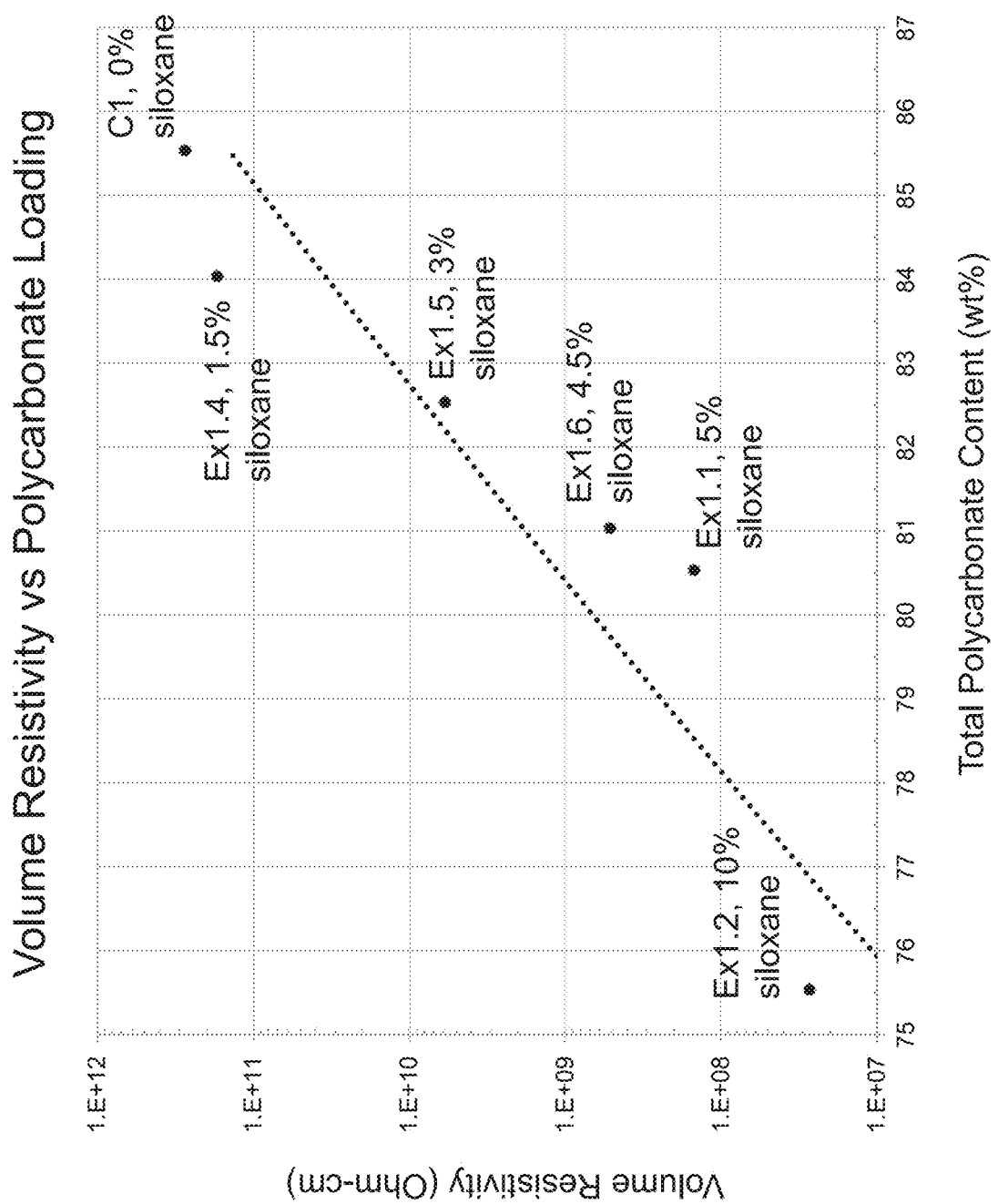

Volume resistivity vs. polycarbonate loading for these compositions is shown in FIG. 6C. Ex1.3 was excluded from this analysis since it delaminated upon molding. From FIG. 6C it is observed that volume resistivity appears to correlate with the amount of polycarbonate present in the formulation. Without being bound by theory, it is believed that adding increasing levels of siloxane to the thermoplastic composition forces the carbon to be confined to smaller and smaller domains in the thermoplastic polymer (e.g., PC), thus increasing the concentration of carbon in the polymer (e.g., PC phase).

This observation may be validated by observing scanning transmission electron microscope (STEM) images of the samples. Example STEM images are illustrated in FIGS. 7A-7H. A Zeiss SUPRA 40 VP Electron Microscope Dark Field SEM/STEM Detector was used. The samples were cryo-microtomed, stained, and imaged in STEM mode at various magnifications. In the images, lighter regions indicate a location where electrons are scattering, while dark regions have no electron scattering. The medium-shaded regions represent the polymer resin matrix. Lighter areas represent the heavier elements (believed to be siloxane) and darker areas represent lighter elements (believed to be carbon black) or voids. From the images, it is observed that as siloxane content is increased there is less clustering of the carbon black. The sample including 15 wt % siloxane shows the best dispersion of what is believed to be carbon black. These STEM micrographs also show that the carbon black particles appear to be preferentially located in the polycarbonate phase, and not in the siloxane phase, evidencing the suggested physical mechanism that correlates the increase in electrical conductivity observed in these materials with the increase of siloxane content in the formulation.

Figure 8:
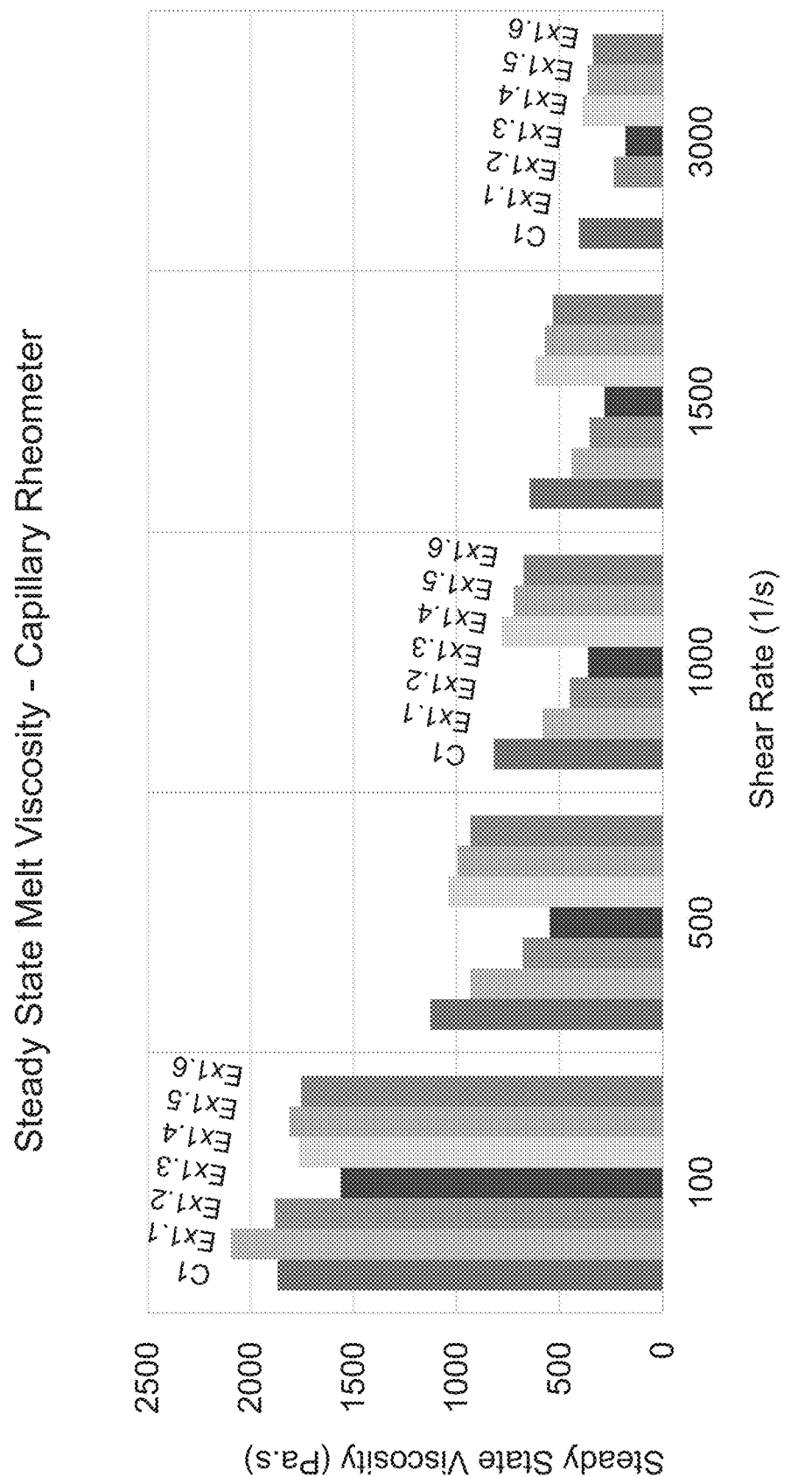
FIG. 8 is a graph showing steady state melt viscosity at shear rates of 100, 500, 1000, 1500 and 3000 inverse seconds (1/s) for comparative and example compositions formed according to the present disclosure.

FIG. 8 shows the melt viscosity (MV, in Pascal-seconds, Pa-s) of the compositions at a shear rate of 100, 500, 1000, 1500 and 3000 1/s, and a temperature of 280° C. Testing was performed in accordance with ASTM D3835. From the results, it was observed that the MV of the blends containing different levels of the PC-Si copolymer with the lower content of siloxane (Ex1.4-Ex.1.6) was similar to that of the comparative composition C1 containing no siloxane. The compositions containing different levels of the PC-Si copolymer with the higher content of siloxane (Ex1.1-Ex.1.3) were less viscous than the control containing no siloxane, especially for shear rates typical of injection molding applications. Further, increasing the level of PC-Si copolymer in the formulation led to a decrease in the viscosity of the material, especially in the case of the copolymer with the higher content of siloxane.

Based on the results shown in the figures and described herein, example compositions Ex1.1 (25 wt % of a PC-Si copolymer having a 20 wt % siloxane content) and Ex1.2 (50 wt % of a PC-Si copolymer having a 20 wt % siloxane content) had the overall best properties.

The Ex1.1 composition, compared to C1 including no PC-Si copolymer, had a similar HDT, improved NII and UNII at RT, improved LT (−30° C.) NII and a similar UNII, improved LT puncture strength and a similar RT puncture strength, a similar RT modulus and elongation, about three orders of magnitude better surface and volume electrical conductivities, and about a 30% better flow (MV) at shear rates typical of injection molding applications.

The Ex1.2 composition, compared to C1, had a slightly lower HDT, similar RT UNII and much improved NII properties, similar LT UNII and much improved NII properties, improved LT puncture impact strength and a similar RT puncture impact strength, a similar RT modulus and elongation, about four orders of magnitude better surface and volume electrical conductivities, and about a 45% better flow (MV) at shear rates typical of injection molding applications.

These results showed that compositions including between about 2 and 14 weight percent siloxane, and in particular about 4 and 14 weight percent siloxane, had improved properties compared to the comparative composition C1 including the same amount of carbon black but no siloxane. These results also showed that formulations including less than 5 wt % total siloxane did not have one or more of the above improvements (see compositions Ex1.4-Ex1.6), and the composition including greater than 14 wt % siloxane (Ex1.3) delaminated when injection molded at high rates of shear.

Further compositions including different amounts of carbon black and a 20 wt % siloxane content PC-Si copolymer were formed (Ex2.1-Ex2.5) and compared to comparative compositions that did not include PC-Si copolymer (C2.1-C2.5). The compositions are shown in Tables 2A and 2B, respectively:

TABLE 2A

| Item Description | Unit | C2.1 | C2.2 | C2.3 | C2.4 | C2.5 |
| --- | --- | --- | --- | --- | --- | --- |
| PC/Additive: | | | | | | |
| PC Powder (100 grade) | % | 43.77 | 42.77 | 41.77 | 40.77 | 39.77 |
| High Flow PC | % | 43.77 | 42.77 | 41.77 | 40.77 | 39.77 |
| EXL resin, opaque, 20 wt % siloxane | % | | | | | |
| Irganox 1076 | % | 0.2 | 0.2 | 0.2 | 0.2 | 0.2 |
| Irgafos 168 | % | 0.26 | 0.26 | 0.26 | 0.26 | 0.26 |
| Carbon Black | % | 12 | 14 | 16 | 18 | 20 |
| Formulation total: | % | 100 | 100 | 100 | 100 | 100 |
| PC/Additives: | % | 88 | 86 | 84 | 82 | 80 |
| Carbon black: | % | 12 | 14 | 16 | 18 | 20 |
| Total siloxane content: | % | — | — | — | — | — |

TABLE 2B

| Item Description | Unit | Ex2.1 | Ex2.2 | Ex2.3 | Ex2.4 | Ex2.5 |
|---|---|---|---|---|---|---|
| PC/Additive: | | | | | | |
| PC Powder (100 grade) | % | 31.27 | 30.27 | 29.27 | 28.27 | 27.27 |
| High Flow PC | % | 31.27 | 30.27 | 29.27 | 28.27 | 27.27 |
| EXL resin, opaque, 20 wt % siloxane | % | 25 | 25 | 25 | 25 | 25 |
| Irganox 1076 | % | 0.2 | 0.2 | 0.2 | 0.2 | 0.2 |
| Irgafos 168 | % | 0.26 | 0.26 | 0.26 | 0.26 | 0.26 |
| Carbon Black | % | 12 | 14 | 16 | 18 | 20 |
| Formulation total: | % | 100 | 100 | 100 | 100 | 100 |
| PC/Additives: | % | 88 | 86 | 84 | 82 | 80 |
| Carbon black: | % | 12 | 14 | 16 | 18 | 20 |
| Total siloxane content: | % | 5 | 5 | 5 | 5 | 5 |

Surface and volume resistivities of the compositions of Tables 2A and 2B are shown in Table 3A and 3B, respectively. Testing was performed in accordance with ASTM D257.

TABLE 3A

| | Unit | C2.1 | C2.2 | C2.3 | C2.4 | C2.5 |
|---|---|---|---|---|---|---|
| Surface resistivity (avg) | Ohm/Sq | — | 1.28E+08 | 8.93E+05 | 1.64E+04 | 1.94E+03 |
| Surface resistivity (std) | | — | 1.50E+07 | 8.00E+04 | 1.90E+03 | 6.40E+01 |
| Surface resistivity (rsd) | % | — | 10 | 9 | 10 | 3 |
| Volume resistivity (avg) | Ohm-cm | 1.06E+15 | 1.97E+09 | 6.41E+06 | 6.91E+04 | 3.44E+03 |
| Volume resistivity (std) | | 2.29E+14 | 3.63E+08 | 1.52E+06 | 1.57E+04 | 3.01E+02 |
| Volume resistivity (rsd) | % | 21.5 | 18.4 | 23.7 | 22.8 | 8.75 |

TABLE 3B

| | Unit | Ex2.1 | Ex2.2 | Ex2.3 | Ex2.4 | Ex2.5 |
|---|---|---|---|---|---|---|
| Surface resistivity (avg) | Ohm/Sq | 6.39E+13 | 1.02E+06 | 3.04E+04 | 3.22E+03 | 8.93E+02 |
| Surface resistivity (std) | | 1.40E+13 | 1.20E+05 | 2.70E+03 | 1.80E+02 | 4.00E+01 |
| Surface resistivity (rsd) | % | 20 | 10 | 9 | 5 | 5 |
| Volume resistivity (avg) | Ohm-cm | 9.82E+13 | 3.98E+07 | 3.75E+05 | 1.32E+04 | 4.32E+03 |
| Volume resistivity (std) | | 1.55E+13 | 4.08E+06 | 3.51E+04 | 1.15E+03 | 6.90E+02 |
| Volume resistivity (rsd) | % | 15.7 | 10.3 | 9.35 | 8.73 | 16 |

Figure 9:
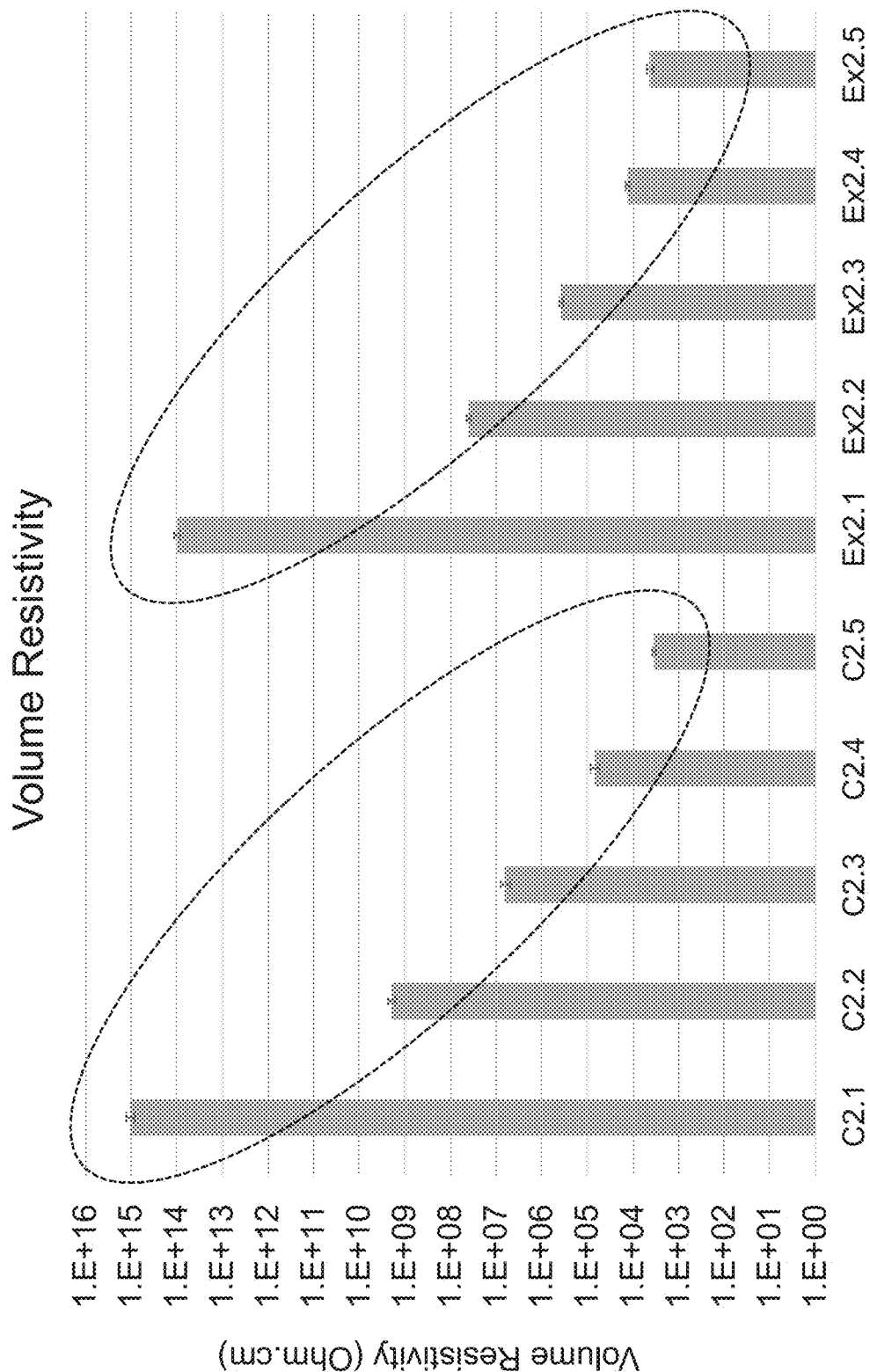
FIG. 9 is a graph showing volume resistivity for comparative and example compositions formed according to the present disclosure.
Figure 10:
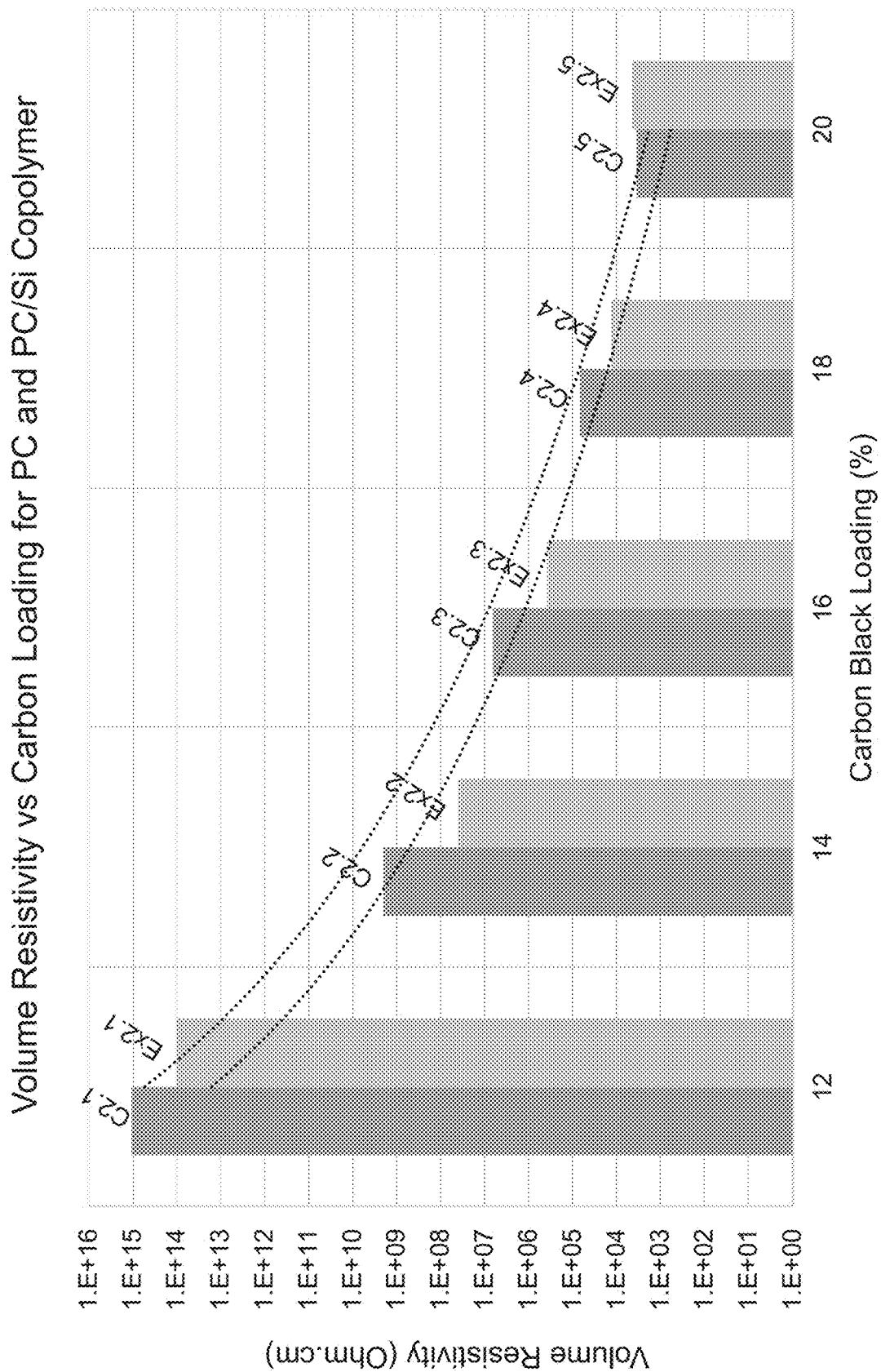
FIG. 10 is a further graph showing volume resistivity for comparative and example compositions formed according to the present disclosure.

Graphs of the volume resistivities of each of these compositions are provided in FIGS. 9 and 10. FIG. 10 shows each example composition alongside its comparative composition having the same carbon black content that does not include the PC-Si copolymer. The figures show that it may be possible to reduce the level of carbon black in siloxane-containing compositions to match the surface and volume resistivities of a siloxane-free control. Lower loadings of carbon may lead, for example, to better ductility and impact strength and also to lower viscosity thus improving the flow of these materials under injection molding conditions. Composition Ex2.2, for example, including 5 wt % siloxane and 14 wt % carbon black showed similar surface resistivity as composition C2.3 that included 16 wt % carbon black but no siloxane. A similar conclusion can be drawn from comparing comparative composition C2.4 to Ex2.3 and C2.5 to Ex2.4.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:
   (a) a thermoplastic polymer comprising a polycarbonate component;
   (b) a poly(carbonate-siloxane) copolymer; and
   (c) from 8 wt % to 22 wt % carbon black,
   wherein the composition has a total siloxane content of from 2 wt % to 14 wt %.

2. The thermoplastic composition according to claim 1, wherein the poly(carbonate-siloxane) copolymer has a siloxane content of from 5 wt % to 25 wt %.

3. The thermoplastic composition according to claim 1, wherein the polycarbonate component comprises a polycarbonate homopolymer, a polycarbonate copolymer that is different from the poly(carbonate-siloxane) copolymer in (b), or a combination thereof.

4. The thermoplastic composition according to claim 1, wherein the carbon black is a structured carbon black having a BET nitrogen surface area of from about 65 square meters per gram ($m^2/g$) to about 1500 $m^2/g$ as determined in accordance with ASTM D3037.

5. The thermoplastic composition according to claim 1, wherein the composition has a volume resistivity of from $10^3$ to $10^9$ Ohm-centimeters (Ohm-cm) as determined in accordance with ASTM D257.

6. The thermoplastic composition according to claim 1, wherein the composition has a melt viscosity at a shear rate of from 500 to 3000 1/second as determined in accordance with ASTM D3835 that is at least about 5% lower than that of a substantially identical reference thermoplastic composition that does not include a poly(carbonate-siloxane) copolymer.

7. The thermoplastic composition according to claim 1, wherein the composition has a notched Izod impact strength at room temperature as determined in accordance with ASTM D256 that is at least about 100% higher than that of a substantially identical reference thermoplastic composition that does not include a poly(carbonate-siloxane) copolymer.

8. The thermoplastic composition according to claim 1, wherein the composition has a notched Izod impact strength at −30 degrees Celsius (° C.) as determined in accordance with ASTM D256 that is at least about 40% higher than that of a substantially identical thermoplastic composition that does not include a poly(carbonate-siloxane) copolymer.

9. The thermoplastic composition according to claim 1, wherein the composition has a puncture impact total energy at −30 degrees Celsius (° C.) as determined in accordance with ASTM D3763 that is at least about 50% higher than that of a substantially identical thermoplastic composition that does not include a poly(carbonate-siloxane) copolymer.

10. The thermoplastic composition according to claim 1, wherein the composition has a surface resistivity as determined in accordance with ASTM D257 that is at least about 90% lower than that of a substantially identical thermoplastic composition that does not include a poly(carbonate-siloxane) copolymer.

11. The thermoplastic composition according to claim 1, wherein the composition comprises from 10 wt % to 21 wt % carbon black and a total siloxane content of from 5 wt % to 12 wt %, and wherein the poly(carbonate-siloxane) copolymer has a siloxane content of from 5 wt % to 25 wt %.

12. The thermoplastic composition according to claim 1, wherein the composition comprises from 13 wt % to 21 wt % carbon black and a total siloxane content of from 5 wt % to 12 wt %, and wherein the poly(carbonate-siloxane) copolymer has a siloxane content of from 5 wt % to 25 wt %.

13. An article comprising the thermoplastic composition according to claim 1.

14. The article according to claim 13, wherein the article is an electronic component.

\* \* \* \* \*